United States Patent Office 3,140,484
Patented July 7, 1964

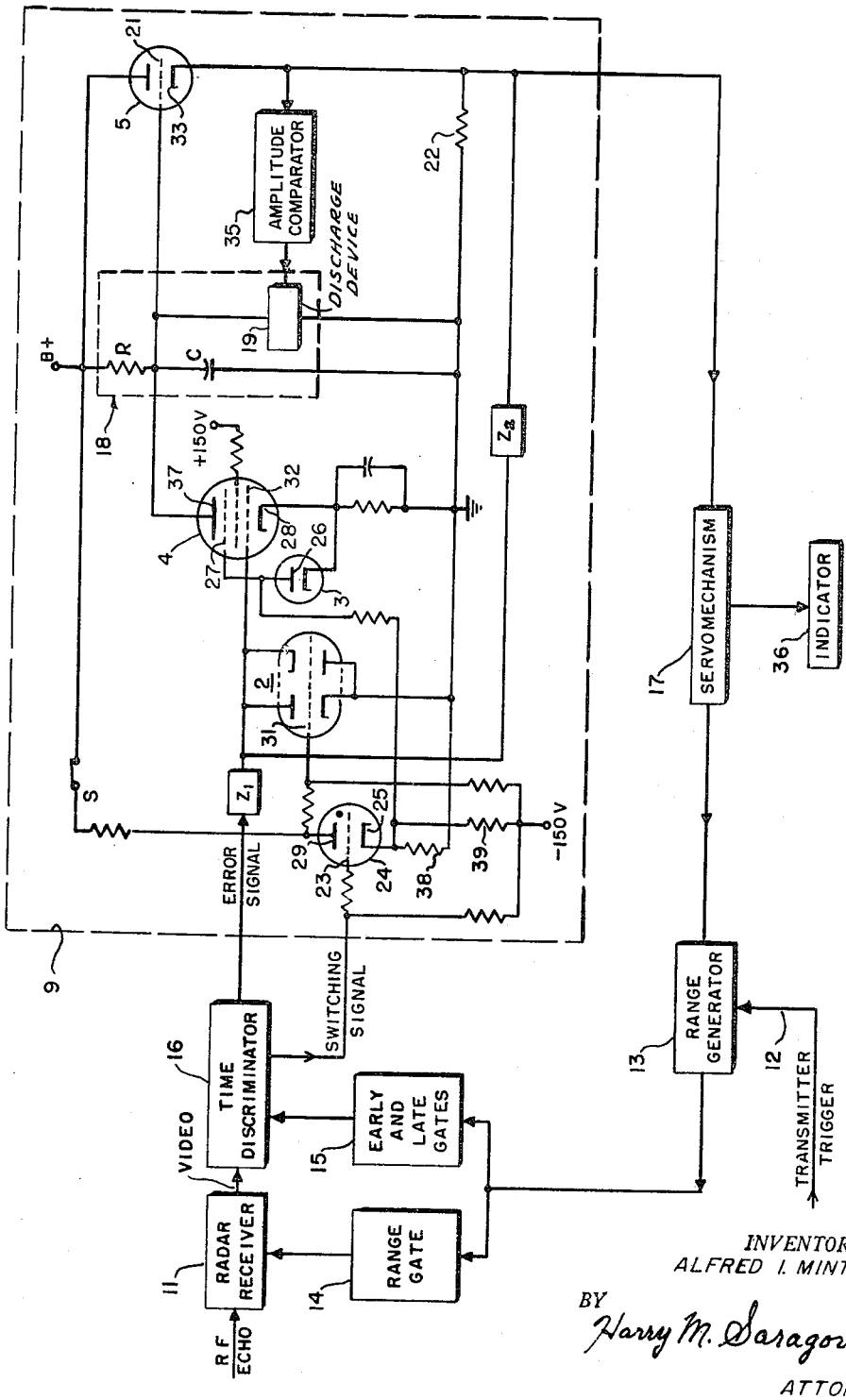

3,140,484
RANGE SWEEP AND POSITIONING CIRCUIT
Alfred I. Mintzer, Haddonfield, N.J., assignor to the United States of America as represented by the Secretary of the Army
Filed Apr. 23, 1959, Ser. No. 808,539
5 Claims. (Cl. 343—7.3)

This invention relates to a pulse tracking radar system, and more particularly, to an improved range sweep and positioning circuit used in such a system.

The usual pulse tracking radar system first searches for a target, and then, upon acquisition of the target, shifts from searching to target tracking. Range tracking is accomplished by a "range gate" kept in coincidence with the target echo signal received by the radar receiver. The "range gate" is a pulse or square wave voltage delayed with respect to the transmitted pulse by an interval corresponding to the distance or range at which a target is sought or located.

During search or, more particularly, before acquisition of the target, the "range gate" is swept through a portion of the range being examined. This is accomplished by continuously changing the delay of the gate voltage or pulse with respect to the transmitted pulse. Upon acquisition of the target the "range gate" sweep must be stopped and the echo pulse continuously tracked. The delay is thereafter varied only as the echo pulse deviates from coincidence with the "range gate." An error signal is produced according to the deviation. The error signal changes the delay and controls a follow-up system to supply range information to a range indicator and/or a computer or other utilization device which is to respond to the target range.

For optimum operation of a pulse tracking radar system of the type described, where the searching voltage (acquisition signal) is varied at a predetermined rate and the tracking voltage must vary in accordance with the time differential between the echo pulse and "range gate," it is necessary that the transition (switching) from the searching function to tracking function be smooth and be performed only on reception of the true echo signal. While prior art pulse tracking radar sets have attempted to achieve this result, they have not done so with the degree of efficiency accomplished by the present invention. In fact, during the transition period many of the prior art systems were forced to track the target or echo signal with the search mode still present, finally disconnecting the search mode and allowing the normal tracking operation to be instituted. These systems required at least two parameter switchings to permit optimum performance of the system under radically different operating conditions. This was necessary since the bandwidth requirement for the search mode was different from that for the tracking mode. The switching had a detrimental effect since it invariably involved the use of energy storage elements which caused serious switch transient problems. Also many of the prior art circuits compromised performance by having the search function and tracking function operate over a single bandwidth instead of each operating over separate bandwidths. In general, all of the prior art circuits have been relatively complex and expensive to manufacture and have added to the size and weight of the equipment in which they are employed.

Accordingly, it is the primary object of the present invention to provide a simplified and reliable automatic range sweep and positioning circuit.

Another object of the present invention is to provide means for switching distance measuring equipment from the searching function to the tracking function and at the same time eliminating switching transients.

A still further object of the present invention is the provision of a lock-on circuit which is sufficiently rapid in its operation to prevent over-shooting and yet is sufficiently retarded in its operation to be unresponsive to spurious signals.

Still another object of the present invention is the provision of means for providing optimum band-pass characteristics and stability for the system during both the searching and tracking functions.

In accordance with the invention, an acquisition sweep means controls the "range gate" sweep during the searching mode. With the acquisition of a target, the acquisition means is disabled and an error voltage signal assumes control of the "range gate," continuing in control for the duration of the tracking mode. Through the application of negative feed-back computer techniques during the tracking mode, the tracking radar system possesses optimum band-pass characteristics for both the searching and tracking modes.

For a better understanding of the present invention, together with further objects and advantages thereof, reference is had to the following description taken in connection with the accompanying drawing in which the single figure is a schematic representation of a tracking radar system employing the present invention.

In the drawing is shown a range sweep and positioning circuit 9 connected to the conventional portions of a pulse tracking radar system including a radar receiver 11. Radio frequency (RF) echo information is received by radar receiver 11. Transmitter trigger signals, from a transmitter (not shown) are fed in at line 12 and applied to range generator 13. The output from range generator 13, a wide gate, is fed to range gate 14 and early and late gates 15. The trailing edge of this wide gate triggers range gate 14 and early and late gates 15, simultaneously. Range gate 14 generates an approximately rectangular narrow gate which is timed or positioned by the trailing edge of the wide gate output wave of range generator 13. The generation of the wide and narrow gates by range generator 13 and range gate 14, respectively, may be accomplished for example, by corresponding circuits disclosed in the Pollard U.S. Patent No. 2,786,995.

The narrow gate from range gate 14 is applied as an enabling gate to radar receiver 11. This receiver is connected to time discriminator 16. When an echo signal is in coincidence with the narrow (range) gate in radar receiver 11, a video output signal is coupled from radar receiver 11 to time discriminator 16, there being no signal coupled if coincidence does not exist. Thus, the range gate isolates, from the total video signal, the signal representing the target to be tracked.

The output from early and late gates 15 is fed to time discriminator 16 as pulses. A typical time discriminator and its operation are disclosed in the Jacobs et al. U.S. Patent No. 2,814,725. This patent also shows typical waveshapes of the video or input signal as well as the early and late gates pulses. The purpose of the early and late gates is to sense the direction of a change in range.

A servomechanism 17, which may comprise, for example, an amplifier, motor and potentiometer, as shown in U.S. Patent No. 2,786,995 to Pollard, is connected to range generator 13 to control the delay of the trailing edge of the wide gate output from the range generator. This wide gate output, in turn, controls the time of initiation of the narrow gate and early and late gates.

The circuits and operation so far described are old in the art and do not constitute any part of the invention. The invention, range sweep and positioning circuit 9, is connected between the time discriminator 16 and servomechanism 17, and functions to accomplish the objects listed above.

Range sweep and positioning circuit 9 comprises a sweep relaxation oscillator 18, gated amplifier 4, positive clamp 3, bidirectional clamp 2 and cathode follower 5, all connected as shown in the figure. Suppressor grid 27 of amplifier 4 is normally below cut-off due to the bias at cathode 25 of thyratron 24, set up by resistors 38 and 39 connected between the negative supply (−150 volts) and ground. Thyratron 24 is normally cut-off due to the negative voltage from the negative supply, through its grid resistors.

Relaxation sweep circuit 18 supplies a sawtooth sweep voltage to the grid of cathode follower 5. This sweep circuit includes capacitor C which is charged from B+ through R and discharged by discharge device 19. Discharge device 19 may be a thyratron, for example. When its firing potential is reached during the charging cycle of capacitor C it conducts to rapidly discharge capacitor C, starting a new sweep cycle.

Cathode follower 5 provides a low impedance output for the sweep generator. This output is coupled to servomechanism 17. Amplitude comparator 35 is connected between discharge device 19 and cathode 33 of cathode follower 5 to set the condition for discharging of capacitor C. In this manner the output from cathode follower 5 controls the amplitude of the sweep voltage applied to its grid 21 by setting the firing condition of discharge device 19 through amplitude comparator 35.

Since servomechanism 17, in effect, positions the trailing edge of the wide gate, and the trailing edge of the wide gate triggers the range gate, as described above, the application of the periodic sawtooth voltage from relaxation circuit 18 to servomechanism 17 cyclicly positions the range gate, i.e., the range gate is moved back and forth periodically sweeping over a given range. Thus the sweep voltage output from relaxation circuit 18 causes the trailing edge of the wide gate to shift cyclically and consequently, the narrow gate and early and late gates to correspondingly shift in time or point of occurrence. This cyclic shifting of the range gates permits the range gate to hunt for a target over a prescribed portion of the total range being viewed and more quickly detect a target.

The description, thus far, has been directed to the searching function of the pulse radar tracking system. This searching function is discontinued and the tracking function begins when a portion of the target echo is within the range gate. When this condition exists, radar receiver 11 applies a video output signal to time discriminator 16.

Time discriminator 16 has two outputs. The first, essentially a threshold voltage derived from integrating a number of samples of the video signal in order to exceed a noise bias voltage, is applied as a switching voltage to grid 23 of thyratron 24. The second, essentially a voltage proportional to the displacement of the target video from the center of the range, is applied as a range error voltage through impedance $Z_1$ to grid 32 of gated amplifier 4. The integration process is essential in order that the true video signal, and not spurious noise, will control the triggering of thyratron 24 to switch the operation of the system from the searching function to the tracking function.

The switching operation of the present invention will now be considered. Target lock thyratron 24 is normally held cut-off prior to acquisition by the difference between voltages applied to its grid and cathode (the voltage applied to the cathode being the control voltage for suppressor 27 of amplifier 4). When the switching voltage is applied to grid 23 from time discriminator 16, thyratron 24 is fired, provided switch S is closed, as shown in the figure. This produces a positive step voltage across cathode resistor 38 which is applied to suppressor grid 27 of amplifier 4 to allow the suppressor to go above cut-off.

Clamping diode 3 is connected between suppressor grid 27 and cathode 28 of gated amplifier 4. When the positive step voltage is applied to plate 26, of diode 3, suppressor grid 27 becomes clamped to cathode 28. This clamping circuit prevents possible suppressor sticking and helps maintain the gain of gate amplifier 4 constant.

Simultaneously with the application of the positive step voltage to suppressor grid 27, a negative step voltage is applied from plate 29 of thyratron 24 to grids 31 of bidirectional clamp 2, cutting off both sections. Bidirectional clamp 2 comprises two triodes connected back-to-back in parallel, forming an electronic switch. Normally, grids 31 are at a positive potential which they derive from the plate circuit of thyratron 24, causing clamp tubes 2 to conduct, tying control grid 32 of amplifier 4 to ground through a low impedance. With bidirectional clamp 2 in this normal condition, any sweep voltage applied from relaxation sweep circuit 18 and cathode follower 5 to impedance $Z_2$ is clamped to ground, and so, cannot change the voltage of grid 32 of amplifier 4. Clamp 2 minimizes transients at the time of switching, thereby insuring reliable lock-on operation when the echo signal coincides with the range gate.

When suppressor grid 27 is above cutoff and bidirectional clamp 2 is open, gated amplifier 4 conducts. Under these conditions the application of an error signal to grid 32 from time discriminator 16, through impedance $Z_1$, causes gated amplifier 4 to draw plate current, disabling relaxation sweep circuit 18, and the range positioning voltage (voltage output from cathode follower 5) becomes a function of the range error signal. This range positioning voltage is applied to servomechanism 17, which in turn keeps the range gate aligned with the video or target information. Thus the saw tooth acquisition voltage, which has been disabled, no longer controls the position of the range gate.

It can be seen from the description so far given that the loop between time discriminator 16 and cathode follower 5 is closed when gated amplifier 4 draws current. On the closing of the loop, the combination of impedance $Z_1$ and $Z_2$, gated amplifier circuit 4, and cathode follower 5 functions as an integrating D.C. amplifier. Amplifier 4 and cathode follower 5 can be considered to be a single amplifier unit having impedance $Z_2$ as a feedback circuit and impedance $Z_1$ as an input circuit. Impedance $Z_2$ is preferably a capacitor, and impedance $Z_1$ is preferably a resistive network.

The rate of increase and decrease of the output from cathode follower 5 depends upon the absolute potential of the input to amplifier 4. This rate of change can be varied by changing the values of impedances $Z_1$ and $Z_2$. It is necessary to adjust the feed-back (impedance $Z_2$) so that the rate of change of the output voltage (range positioning voltage) of cathode follower 5 applied to servomechanism 17 will not vary too rapidly or too slowly. If the rate of change is too rapid, the overall operation of the circuit becomes unstable with a tendency to "hunt." If the rate of change is made too slow, the operation of the circuit becomes sluggish, inaccurate, and much too slow to "lock-in," the "lock-in" condition occurring when the input potential to amplifier 4 becomes zero, i.e., after the tracking function has taken place.

Due to impedance $Z_1$ forming a feedback for the amplifier unit, the range positioning voltage is actually the error signal as modified by the feedback amplifier transfer function. The feedback amplifier transfer function affects the bandwidth characteristics of gated amplifier 4. It can be controlled accurately and flexibly by varying relative stable parameters such as passive impedance $Z_1$ and $Z_2$. Therefore, by varying impedances $Z_1$ and $Z_2$ the bandwidth of amplifier 4 can be readily shaped. Accordingly, the bandwidth of the amplifier will be relatively independent of the gain of the amplifier provided the gain can be maintained greater than 20 db.

An indicator 36, can be used to give an accurate direct reading of the range of the target. Such an indicator might, for example, comprise a shaft coupled to servomechanism 17 and a pointer attached to the shaft, the pointer having its position calibrated in terms of range.

A cathode ray oscilloscope may be used to observe the approximate distance of the target by being connected to radar receiver 11.

In summary, the present invention is an improvement over the prior art since it provides an open-loop operation during the searching function and a closed-loop operation during the tracking function. During the closed-loop condition the range (narrow) gate has its position determined by the target, while during open-loop condition the range gate position is independent of the target. The open-loop condition can be defined as existing during the searching mode when gate amplifier 4 is cut-off and relaxation circuit 18 is functioning, for at that time, the circuit between time discriminator 16 and plate 37 of gate amplifier 4 is, in effect, an open circuit. The closed-loop condition can be defined as existing during the tracking mode when gated amplifier 4 is conducting and relaxation circuit 18 is disabled, for there is a continuous loop from time discriminator 16 through gated amplifier and back again to time discriminator 16. By allowing the pulse radar tracking system to change from the open to closed-loop condition optimum band-pass characteristics can be achieved during both the searching and tracking functions. There is no necessity to compromise the bandwidth requirements for either function. This is a definite improvement over the prior art where, additionally, a switching process was necessary to put the acquisition (sawtooth) signal into the closed-loop system. In those systems the closed-loop existed for both searching and tracking functions.

The foregoing disclosure relates to a preferred embodiment of the invention. Numerous modifications or alterations may be made therein without departing from the spirit and the scope of the invention as set forth in the appended claims.

What is claimed is:

1. An automatic acquisition and tracking apparatus comprising receiving means for receiving echo information, gating means connected to said receiving means for producing a range gate and thereby allowing the passage of echo information by said receiving means; a servomechanism connected to said gating means to control said range gate; a relaxation oscillator; output coupling means for feeding the output from said relaxation oscillator to said servomechanism; amplitude comparator means for controlling the discharge of said relaxation oscillator connecting said output coupling means to said relaxation oscillator; a time discriminator connected to said receiving means and said gating means, said time discriminator producing an error signal and a switching signal; an input impedance; means for coupling said error signal from said time discriminator to said input impedance; a switching means; means for coupling said switching signal from said time discriminator to said switching means; a gated amplifier, said switching means and said input impedance being connected to said gated amplifier; means for coupling the output from said gated amplifier to said output coupling means; and means for feeding back information from said output coupling means to the input of said gated amplifier.

2. In a system for automatically acquiring and tracking a target, a range sweep and positioning circuit comprising: a gated amplifier having at least a plate, a cathode, a control grid and a suppressor grid; first clamping means connected between said cathode and said suppressor grid; second clamping means connected between said control grid and ground, and having an input control means; an input impedance connected to said control grid; switching means comprising a gas discharge tube having a control element, a plate connected to said input control means and a cathode connected to said first clamping means; output means; means comprising a relaxation oscillator connected between the plate of said gated amplifier and said output means; and impedance means coupling said output means to said control grid to furnish feedback in said system.

3. In a system for automatically acquiring and tracking a target, a range sweep and positioning circuit comprising: a gated amplifier having at least a plate, a cathode, a control grid and a suppressor grid, a clamping diode having a cathode and a plate, said cathode and said plate of said diode being connected to said cathode and said suppressor grid respectively of said amplifier; a clamping circuit having a control element, said clamping circuit being connected between said control grid of said amplifier and ground; a thyratron having a cathode and a plate, said plate and said cathode of said thyratron being connected respectively to said control element and said plate of said diode; a first impedance connected to said control grid of said amplifier; a relaxation oscillator connected to said plate of said amplifier; a cathode follower having a grid and a cathode, said grid of said cathode follower being connected to said plate of said amplifier; a resistor connected between ground and said cathode of said cathode follower; means for setting the repetition rate of said oscillator, said means being connected between said oscillator and said cathode of said cathode follower; and a second impedance connected between said cathode of said cathode follower and said control grid of said amplifier.

4. The system of claim 3 wherein said clamping circuit comprises two triodes reversely connected, the plate of each triode being connected to the cathode of the other, the plate of one of said triodes being connected to said control grid and the plate of said other triode being coupled to ground, the grids of said triodes being coupled together as said control element.

5. In a system for automatically acquiring and tracking a target, a range sweep and positioning circuit comprising: a gated amplifier having at least a first and a second input electrode and an output electrode; output means; a relaxation oscillator; said oscillator and said amplifier output electrode being connected to said output means; switching means having an input terminal and first and second output terminals; variable clamping means connected to said first amplifier input electrode; said first switching output terminal being connected to said clamping means, and said second switching output terminal being connected to said second amplifier input electrode; means for coupling an error signal to said first amplifier input electrode; and means for connecting a switching signal to said input terminal of said switching means.

References Cited in the file of this patent

UNITED STATES PATENTS

| 2,760,189 | McCoy et al. | Aug. 21, 1956 |
| 2,912,686 | Dodington et al. | Nov. 10, 1959 |
| 2,915,747 | Segerstrom | Dec. 1, 1959 |
| 2,928,083 | Kernan | Mar. 8, 1960 |
| 3,021,522 | Gleason | Feb. 13, 1962 |